(12) United States Patent
Atwell et al.

(10) Patent No.: US 9,188,430 B2
(45) Date of Patent: Nov. 17, 2015

(54) COMPENSATION OF A STRUCTURED LIGHT SCANNER THAT IS TRACKED IN SIX DEGREES-OF-FREEDOM

(71) Applicant: FARO Technologies, Inc., Lake Mary, FL (US)

(72) Inventors: Paul C. Atwell, Lake Mary, FL (US); Robert E. Bridges, Kennett Square, PA (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 134 days.

(21) Appl. No.: 14/207,953

(22) Filed: Mar. 13, 2014

(65) Prior Publication Data
US 2014/0268178 A1 Sep. 18, 2014

Related U.S. Application Data (63) Continuation-in-part of application No. 13/826,584, filed on Mar. 14, 2013, now Pat. No. 9,046,360.

(51) Int. Cl.
*G01B 11/24* (2006.01)
*G01B 11/03* (2006.01)
*G01B 11/00* (2006.01)
*G01C 15/00* (2006.01)
*G01C 25/00* (2006.01)
(Continued)

(52) U.S. Cl.
CPC .............. *G01B 11/24* (2013.01); *G01B 11/005* (2013.01); *G01C 15/002* (2013.01); *G01C 25/005* (2013.01); *G01S 17/023* (2013.01); *G01S 17/66* (2013.01)

(58) Field of Classification Search
CPC .............................. G01B 11/24; G01B 11/005
USPC ............................................................ 33/503
See application file for complete search history.

(56) References Cited

U.S. PATENT DOCUMENTS

| 5,198,868 A | 3/1993 | Saito et al. |
| 5,301,005 A | 4/1994 | deVos et al. |
| 5,930,030 A | 7/1999 | Scifres |

(Continued)

FOREIGN PATENT DOCUMENTS

| CN | 1263807 A | 8/2000 |
| CN | 1290850 | 4/2001 |

(Continued)

OTHER PUBLICATIONS

International Search report of the International Application No. PCT/US2014/027040 mailed Jul. 16, 2014.

(Continued)

*Primary Examiner* — Christopher Fulton
(74) *Attorney, Agent, or Firm* — Cantor Colburn LLP (57) ABSTRACT

A method is provided for determining the three dimensional coordinates of points on the surface of an object. The method includes providing a structured light scanner and a coordinate measurement device. The coordinate measurement device tracks the location and orientation of the structured light scanner during operation. The location and orientation data is combined with image frames captured by the scanner to allow registration of the image frames relative to each other. The three-dimensional coordinates of points on the surface of the object may then be determined in the frame of reference of the coordinate measurement device.

7 Claims, 4 Drawing Sheets

(51) Int. Cl.
*G01S 17/02* (2006.01)
*G01S 17/66* (2006.01)

(56) References Cited

U.S. PATENT DOCUMENTS

| | | | |
|---|---|---|---|
| 6,097,897 A | 8/2000 | Ide | |
| 6,166,809 A | 12/2000 | Pettersen et al. | |
| 6,611,617 B1 | 8/2003 | Crampton | |
| 6,650,222 B2 | 11/2003 | Darr et al. | |
| 7,256,899 B1 * | 8/2007 | Faul | G01B 11/2522 345/420 |
| 7,312,862 B2 | 12/2007 | Zumbrunn et al. | |
| 7,336,375 B1 * | 2/2008 | Faul | G01B 11/2522 345/168 |
| 8,422,034 B2 | 4/2013 | Steffensen et al. | |
| 8,437,011 B2 | 5/2013 | Steffensen et al. | |
| 8,467,072 B2 | 6/2013 | Cramer et al. | |
| 8,537,375 B2 | 9/2013 | Steffensen et al. | |
| 8,654,354 B2 | 2/2014 | Steffensen et al. | |
| 8,659,749 B2 | 2/2014 | Bridges | |
| 8,848,203 B2 * | 9/2014 | Bridges | G01C 15/002 356/614 |
| 8,970,823 B2 * | 3/2015 | Heidemann | G01B 11/25 356/2 |
| 9,041,914 B2 * | 5/2015 | Tohme | G01S 17/003 356/3.01 |
| 9,046,360 B2 * | 6/2015 | Atwell | G01C 15/00 |
| 2011/0003507 A1 | 1/2011 | Van Swearingen et al. | |
| 2011/0301902 A1 | 12/2011 | Panagas | |
| 2012/0188559 A1 | 7/2012 | Becker et al. | |
| 2012/0206808 A1 | 8/2012 | Brown et al. | |
| 2012/0262550 A1 | 10/2012 | Bridges | |
| 2012/0262573 A1 | 10/2012 | Bridges | |
| 2012/0262728 A1 | 10/2012 | Bridges et al. | |
| 2012/0265479 A1 | 10/2012 | Bridges | |
| 2013/0037694 A1 | 2/2013 | Steffensen et al. | |
| 2013/0155386 A1 | 6/2013 | Bridges | |

FOREIGN PATENT DOCUMENTS

| | | |
|---|---|---|
| CN | 1362692 | 8/2002 |
| CN | 101203730 A | 6/2008 |
| CN | 101297176 A | 10/2008 |
| CN | 101427155 A | 5/2009 |
| CN | 201548192 U | 8/2010 |
| DE | 7704949 U1 | 6/1977 |
| DE | 10160090 A1 | 7/2002 |
| DE | 102005019058 A1 | 12/2005 |
| DE | 102007058692 A1 | 6/2009 |
| EP | 2322901 A2 | 5/2011 |
| GB | 2503179 A | 12/2013 |
| GB | 2503390 A | 12/2013 |
| GB | 2516528 A | 1/2015 |
| GB | 2518544 A | 3/2015 |
| GB | 2518769 A | 4/2015 |
| GB | 2518998 A | 4/2015 |
| JP | H0331715 A | 2/1991 |
| JP | H0371116 A | 3/1991 |
| JP | H06214186 | 8/1994 |
| JP | H09113223 | 5/1997 |
| JP | H102722 A | 1/1998 |
| JP | H10107357 A | 4/1998 |
| JP | H11513495 A | 11/1999 |
| JP | 2000503476 A | 3/2000 |
| JP | 2001513204 A | 8/2001 |
| JP | 2002089184 A | 3/2002 |
| JP | 2005010585 | 1/2005 |
| JP | 2006003127 A | 1/2006 |
| JP | 2006276012 A | 10/2006 |
| WO | 2006052259 A1 | 5/2006 |
| WO | 2007124010 A2 | 11/2007 |
| WO | 2008121919 A1 | 10/2008 |
| WO | 2011112277 A1 | 9/2011 |

OTHER PUBLICATIONS

Written Opinion of the International Searching Authority for International Application No. PCT/US2014/027040 mailed Jul. 16, 2014.
English Abstract of JPH09113223; Applicant: Fuji Xerox Co Ltd; Published Date: May 2, 1997; 1 pg.
English Abstract of CN1362692; Applicant: Univ Tianjin; Published Date: Aug. 7, 2002; 1 pg.
English Abstract of JP2005010585; Applicant: TDK Corp; Published Date: Jan. 13, 2005; 1 pg.
English Abstract of JPH06214186; Applicant: Eastman Kodak Co Ltd; Published Date: Aug. 5, 1994; 1 pg.
English Abstract of CN1290850; Applicant: Univ Shanghai Communication; Published Date: Apr. 11, 2001; 1 pg.
Burge, James H., et al, Use of a commerical laser tracker for optical alignment, Proc, of SPIE vol. 6676, Sep. 21, 2007, pp. 66760E-1-6 6760E-12.
Chen, Jihua, et al, Research on the Principle of 5/6-DOF Laser Tracking Metrology, Journal of Astronautic Metrology and Measurement vol. 27, No. 3, May 31, 2007, pp. 58-62.
"DLP-Based Structured Light 3D Imaging Technologies and Applications" by J. Geng; Proceedings of SPIE, vol. 7932. Published Feb. 11, 2011, 15 pages.

* cited by examiner

COMPENSATION OF A STRUCTURED LIGHT SCANNER THAT IS TRACKED IN SIX DEGREES-OF-FREEDOM

CROSS REFERENCE TO RELATED APPLICATIONS

The present application is a continuation-in-part application of U.S. patent application Ser. No. 13/826,584 entitled "System and Method of Acquiring Three Dimensional Coordinates Using Multiple Coordinate Measurement Devices" filed on filed on 63 Mar. 2013, the entire contents of which are incorporated by reference.

BACKGROUND OF THE INVENTION

The subject matter disclosed herein relates to a system and method of acquiring three-dimensional coordinates of points on a surface of an object and in particular to a system and method of operating a laser tracker in conjunction with a scanner device to track the position and orientation of the scanner device during operation.

The acquisition of three-dimensional coordinates of an object or an environment may be known using a variety of measurement devices. An environment is defined to be the collection of object surfaces within range of a measurement device. One type of measurement device is a time-of-flight system such as a laser tracker that directs a beam of light such as a laser beam toward a retroreflector target to be measured. In an embodiment, an absolute distance meter is used to determine the distance from the tracker to the retroreflector target based on a length of time it takes the light to travel to the target and return. By placing the retroreflector target in contact with an object surface, the coordinates of the object surface may be determined. A laser tracker directs the beam of light in a selected direction by rotating two axes with motors. The angles of rotation of the two axes are measured with angular transducers such as angular encoders. By measuring the one distance and two angles, a laser tracker may determine the three-dimensional (3D) coordinates of the retroreflector target. Some laser trackers have additional capability of measuring orientation of a target, thereby providing measurements of six degrees-of-freedom (6DOF).

An alternative to a time-of-flight measurement device is a scanning system that determines 3D coordinates based on triangulation principles. System such as laser trackers that make use of time-of-flight distance meters in some cases are more accurate than triangulation scanners, but triangulation scanners may be faster because they project a plurality of light spots onto the surface at each instant in time.

A triangulation scanner projects either a line of light (e.g. light from a laser line probe) or a pattern of light over an area (e.g. structured light) onto the surface. In the system, a camera is coupled to a projector in a fixed mechanical relationship. The projected pattern of light emitted from the projector is reflected off of the surface and imaged by the camera. Since the camera and projector are arranged in a fixed relationship, the distance and angles to the object may be determined from the projected pattern, the captured camera images and a baseline distance separating the projector and the camera according to trigonometric principles. Triangulation systems provide advantages in quickly acquiring 3D coordinate data over large areas.

In some systems, during the scanning process, the scanner acquires a series of 3D images, which may be registered relative to each other so that the position and orientation of each 3D image relative to the other 3D images is known. If the scanner is stationary, such registration is not necessarily. Similarly if the scanner is attached to a mechanical device having the ability to measure the position and orientation of the scanner, it is not necessary to provide such registration. Examples of such mechanical devices include articulated arm CMMs and Cartesian CMMs. Where the scanner is handheld and hence movable, various techniques may be used to register the images. One common technique uses features in the images to match overlapping areas of adjacent image frames. This technique works well when the object being measured has many features relative to the field of view of the scanner. However, if the object contains a relatively large flat or curved surface, the images may not properly register relative to each other.

Accordingly, while existing coordinate measurement devices are suitable for their intended purposes, the need for improvement remains, particularly in improving the registration of images acquired by a scanner device.

BRIEF DESCRIPTION OF THE INVENTION

According to one aspect of the invention, a method of determining coordinates of points on the surface of an object with a coordinate measurement device and a portable structured light scanner device is provided. The method includes providing a structured light scanner having a body, a first camera and a first projector coupled to the body wherein the first camera is configured to receive light reflected from the object surface. The structured light scanner includes a probe extending from a first side of the body and a six degree of freedom retroreflector coupled to a second side of the body. The structured light scanner further having a first processor configured to determine the coordinates of points on an object surface in a scanner frame of reference. A coordinate measurement device is provided. The coordinate measurement device is configured to measure a translational set of coordinates and an orientational set of coordinates, the translational set being values of three translational degrees of freedom of the structured light scanner in the device frame of reference and the orientational set being values of three orientational degrees of freedom of the structured light scanner in the device frame of reference. The translational set and the orientational set defining a position and orientation of the structured light scanner in space, the coordinate measurement device configured to send a first beam of light to the retroreflector and to receive a second beam of light from the retroreflector, the second beam of light being a portion of the first beam of light, the coordinate measurement device including a device processor. The device processor configured to determine the orientational set and the translational set, the translational set based at least in part on the second beam of light. A fixture is provided having a portion configured to receive the probe. The probe is placed on the portion. The structured light scanner is moved in a predetermined pattern while maintaining the probe in contact with the portion and tracking the coordinates and orientation of the six degree of freedom retroreflector. The translational set of coordinates and orientational set of coordinates are determined for the structured light scanner in response to the movement of the structured light scanner.

According to another aspect of the invention, a method is provided. The method includes providing a structured light scanner having a first camera and a first projector arranged in a fixed relationship to each other, the structured light scanner configured to acquire a plurality of images of an object, the structured light scanner having a six degree of freedom retroreflector arranged in a fixed relationship to the first camera and first projector. A coordinate measurement device is provided having a light source and a second camera arranged in a fixed relationship to each other, the coordinate measurement device configured to determine the location and orientation of the structured light scanner based at least in part on a translational set of coordinates and an orientational set of coordinates. The translational set being values of three translational degrees of freedom of the structured light scanner in a device frame of reference and the orientational set being values of three orientational degrees of freedom of the structured light scanner in the device frame of reference. The object is scanned with the structured light scanner and obtaining at least a first image frame and a second image frame. The six degree of freedom retroreflector is tracked with the coordinate measurement device to determine the orientational set of coordinates and the translational set of coordinates. Coordinates of a plurality of points on a surface of the object are determined in the device frame of reference based at least in part on the first image frame, the second image frame, the orientational set of coordinates and the translational set of coordinates.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide advantages in registration of images acquired by a scanner device. Embodiments of the invention provide further advantages in the tracking of a handheld scanner device with a coordinate measurement device such as a laser tracker device. Still further embodiments of the invention provide advantages in calibrating/compensating the scanner device being tracked by the laser tracking device.

Figure 1:
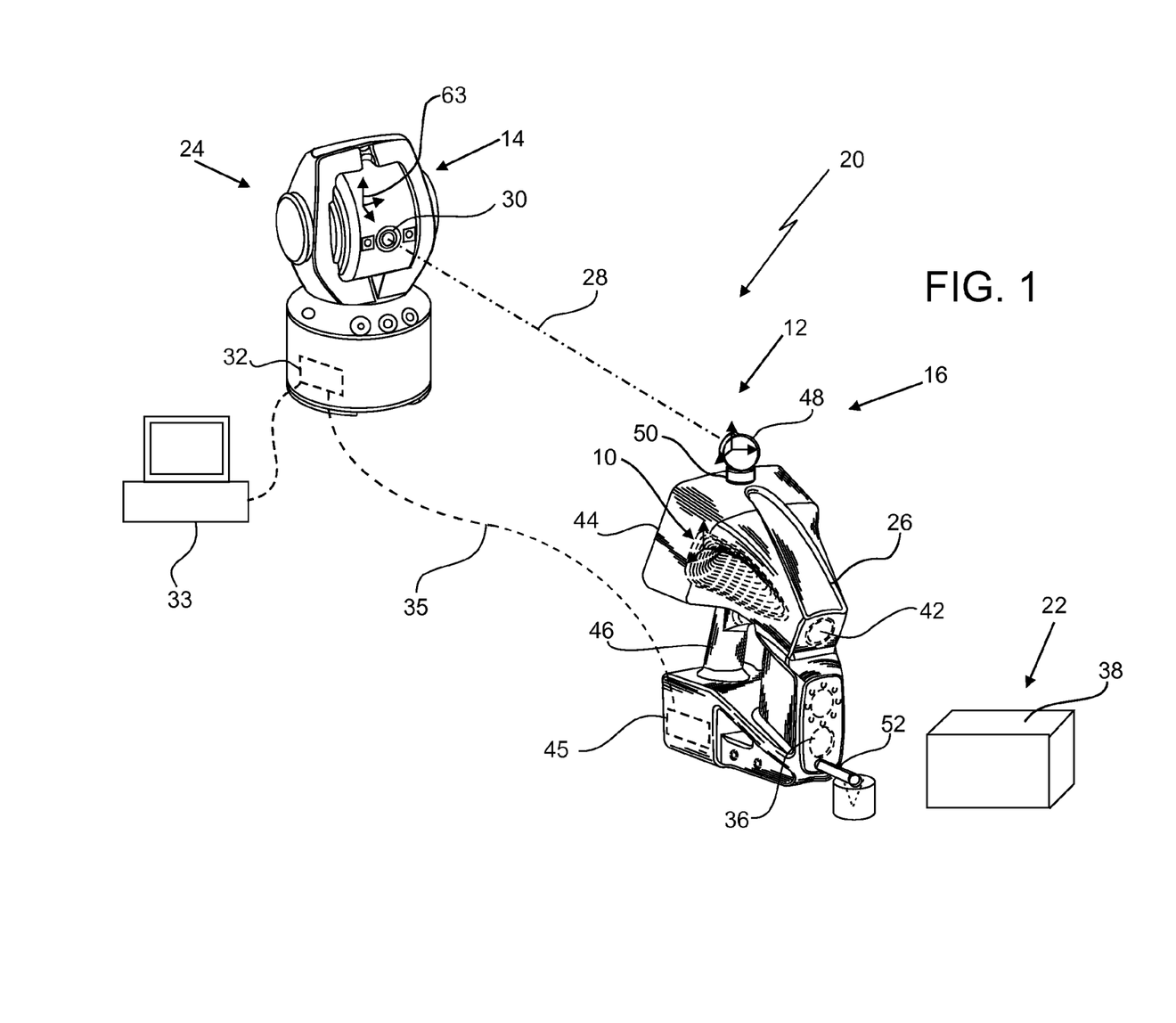
FIG. 1 is a perspective view of a system for measuring an object in accordance with an embodiment of the invention.
Figures 2, 3:
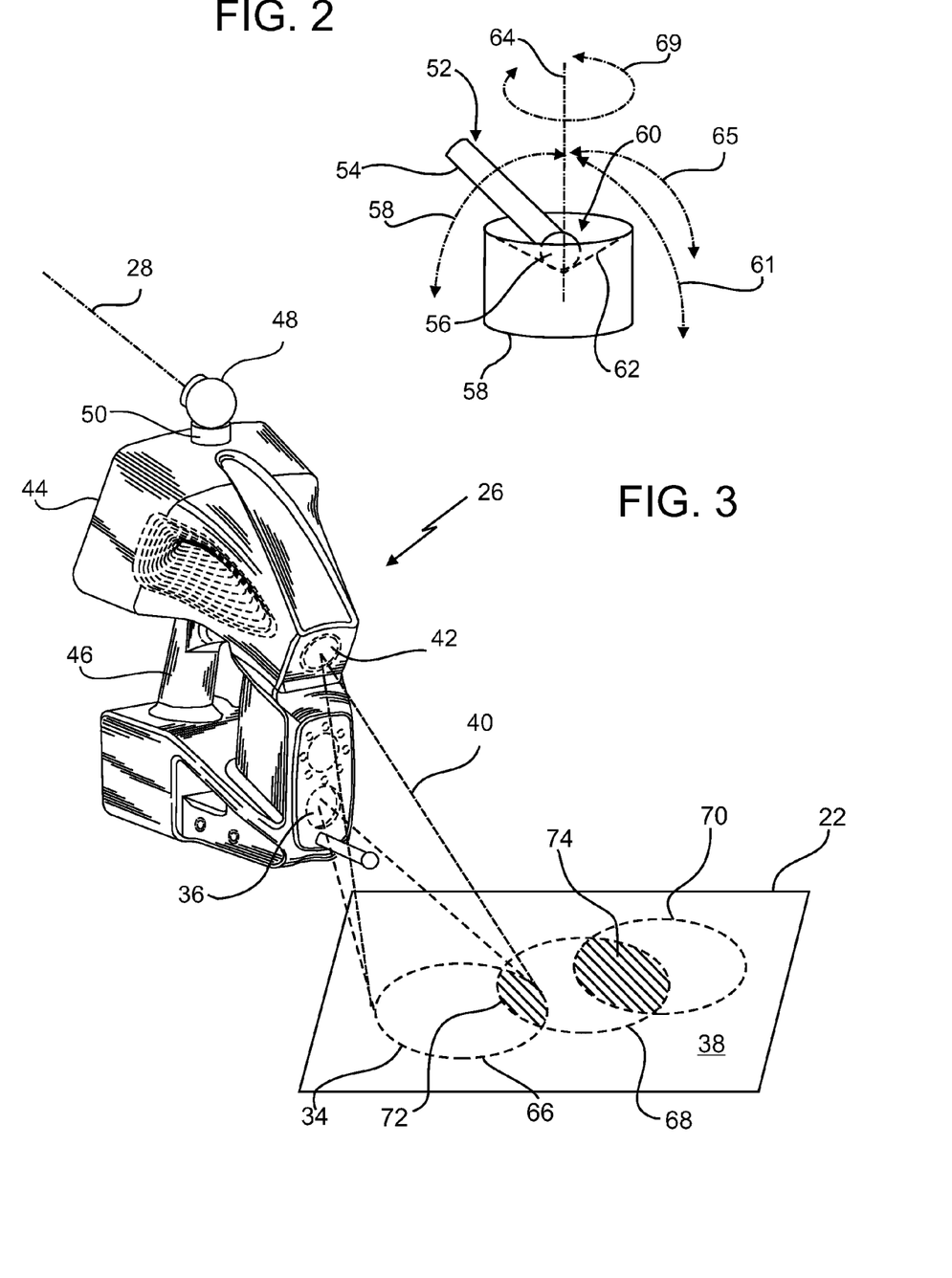
FIG. 2 is a partial perspective view of a scanner probe member in a fixture.
FIG. 3 is a partial perspective view of the system of FIG. 1 with the scanner device scanning an object.

Referring to the FIGS. 1-3, a system 20 is shown for measuring the three-dimensional coordinates of an object 22. The system includes a first coordinate measurement device, such as laser tracker 24 that cooperates with a second coordinate measurement device, such as scanner 26. The laser tracker 24 may be a device such as that described in commonly owned U.S. Pat. No. 8,659,749 filed on Aug. 3, 2010 or United States Patent publication 2013/0155386 filed Apr. 23, 2012, both of which are incorporated by reference herein in their entirety.

The laser tracker 24 includes a projector that emits light, such as a laser for example, and a distance meter. The projector and distance meter are configured to emit and receive light 28 via an aperture 30. The distance meter may be an absolute distance meter assembly which allows the laser tracker 24 to optically measure the distance between the laser tracker 24 and a cooperative target, such as a retroreflector for example.

The six degree-of-freedom (6DOF) laser tracker 24 may include motors, angular encoders and a position detector that allows the laser tracker 24 to track the position of a 6DOF retroreflector target as it is moved through space. A 6DOF retroreflector target is one that can be measured in 6DOF by a 6DOF laser tracker. In other words, the 6DOF tracker is able to determine the three translational coordinates of the target (the "position") and also to determine the three orientational degrees of freedom in a tracker frame of reference 63. For example, three translational degrees of freedom might be x, y, z and three orientational degrees of freedom might be pitch, roll, and yaw angles. Provided within the laser tracker 24 is a controller 32 having a processor configured to determine the three dimensional coordinates of the retroreflector based at least in part on the distance to the retroreflector and on signals from the angular encoders. The controller 32 may further have additional circuitry, including but not limited to communications circuits which allow the laser tracker 23 to communicate with the scanner 26 or a computer 33 via a wired or wireless communications medium 35.

A 6DOF tracker will in additional have the ability to measure the orientation of the target. One method for measuring the orientation of retroreflector target is to make non-reflecting portion on each of the intersecting junctions (lines) of the three planar reflectors of a cube corner retroreflector and then capturing the image of those "dark" lines on a zoom camera within the laser tracker (not shown). A 6DOF retroreflector having non-reflecting intersection lines is described in commonly assigned US Patent Publication No. 2012/0206808, the contents of which are incorporated by reference.

Another example of a 6DOF tracker is one that includes points of light in addition to a retroreflector target. By using at least three non-collinear points of light, it is possible to determine the orientation of the target by imaging the points of light with a camera located on the laser tracker 24. A third type of 6DOF tracker is one that removes a portion of the common vertex of a cube-corner retroreflector, thereby allowing a portion of the light from a laser tracker to pass through the retroreflector and strike a detector behind the cube corner. The detector is of the type that determines a position of the light striking it. It may be a photosensitive array or a position sensitive detector, for example. By noting the position of the light on the detector, the pitch and yaw angles of the 6DOF target may be determined.

We may consider any of the 6DOF targets described hereinabove to constitute a 6DOF assembly 16, which is represented in FIG. 1 as 6DOF retroreflector 48 having an assembly frame of reference 12. However, device 48 of FIG. 1 represents any suitable 6DOF assembly 16. The 6DOF assembly 16 includes a retroreflector 48 but otherwise may include any elements that, cooperating with 6DOF laser tracker 24, provides the position and orientation of the 6DOF assembly. It could for example use three or more non-collinear points of light or it could include a detector positioned behind a cube-corner retroreflector having a portion of its vertex removed, as described hereinabove.

In the exemplary embodiment, the scanner 26 is a structured light scanner. As defined herein, a structured light scanner is one that projects a pattern of light over an area. It is distinct from a scanner that projects a line (also referred to as a "stripe") of light or that sweeps a spot of light. In general, a line of light may not be absolutely straight but will be at least approximately straight. A structured light scanner may therefore be considered to be a type of scanner that projects light having at least three non-collinear points when the points are viewed in a plane perpendicular to the direction of projection.

The scanner 26 first emits a structured light pattern 34 with projector 36 onto surface 38 of an object 22 as shown in FIG. 3. The structured light pattern 34 may include the patterns disclosed in the journal article "DLP-Based Structured Light 3D Imaging Technologies and Applications" by Jason Geng published in the Proceedings of SPIE, Vol. 7932, which is incorporated herein by reference. The light 34 from projector 36 is reflected from the surface 38 and the reflected light 40 is received by the camera 42. It should be appreciated that variations in the surface 38 create distortions in the structured pattern when the image of the pattern is captured by the camera 42. Since the pattern is formed by structured light, it is possible in some instances for a controller 45 to determine a one to one correspondence between the pattern transmitted by the projector and the image received by a photosensitive array within the camera.

Determining the correspondence between a projected pattern and corresponding camera enables triangulation principles to be used to determine the coordinates of a 3D object whose image is captured by a light sensor or photosensitive array within the camera 42. The collection of three-dimensional coordinates of the surface 38 is sometimes referred to as a point cloud. By moving the scanner 26 over the surface 38, a point cloud of the entire object 22 may be created. The 3D coordinates of the measured points are typically determined in a local frame of reference 10 of the scanner 26.

The scanner 26 further includes a body 44 having a handle 46 that allows an operator to carry and operate the scanner 26. In the exemplary embodiment, a six degree of freedom retroreflector 48 is coupled to the body 44 along a top surface. The retroreflector 48 may be similar to the one described in commonly owned United States Patent Application publication 2012/0206808 filed on Feb. 10, 2012 or United States Patent Application publication 2012/0262550 filed on Apr. 11, 2012, both of which are incorporated by reference herein in their entirety. In one embodiment, the retroreflector 48 is coupled to a nest 50. The nest 50 may be a magnetic nest, or may include a clamping arrangement that holds the retroreflector 48 in place during operation. In still other embodiments, one or more the retroreflectors 48 are integrated into the body 44.

The scanner 26 further includes a probe member 52. In the exemplary embodiment, the probe member 52 includes a shaft portion 54 and a end member 56 having a spherical shaped surface with a predetermined diameter. The probe member 52 is coupled to the body 44 and is in a predetermined fixed geometrical relationship with the retroreflector 48. It should be appreciated that while embodiments herein illustrate the probe member 52 as being located in the lower front portion of the scanner 26, this is for exemplary purposes and the claimed invention should not be so limited. In other embodiments, the probe member 52 may be positioned on other portions of the scanner 26, such as on a lower surface for example.

Since the scanner 26 includes the retroreflector 48, it is possible for the laser tracker 24 to track and record the position of the scanner 26 during the scanning process. As will be discussed in more detail below, the tracking of the scanner 26 facilitates the registration of images acquired by the scanner 26 and provides advantages in allowing registration in featureless regions of the object 22.

Before the scanner 26 is tracked by the laser tracker 24, the scanner 26 needs to be calibrated or compensated such that the orientation of the retroreflector 48 and the orientation of the scanner 26 are known to the laser tracker 24. In the exemplary embodiment, the calibration of the scanner 26 to the laser tracker 24 is performed using a fixture 58 (FIG. 2). The fixture 58 is a device having a predetermined geometric configuration that is known to the laser tracker 24. In one embodiment, the fixture 58 includes a recess 60 having a conical or frustoconical surface 62 having a predetermined internal angle such as 60 to 120 degrees for example. In another embodiment, the fixture 58 includes three spheres placed on a circle and separated from one another by 120 degrees.

To calibrate or compensate the scanner 26 to the laser tracker 24, a calibration routine is initiated that guides the operator through the calibration process. The user interface for the operator may be located on the scanner 26, the laser tracker 24 or on remote computer 33 for example. In one embodiment, the calibration process shows the operator a graphical representation of the probe member 52 in the fixture 58, similar to that shown in FIG. 2 for example. The operator is then instructed to move the scanner 26 in a predetermined pattern while maintaining the spherical end member 56 in contact with the surface 62. In the exemplary embodiment, the predetermined pattern includes first pivoting the scanner 26 about the spherical end member 56 in three directions as indicated by arrows 58, 61, 65. In one embodiment, the directions 58, 61 are 90 degrees apart and the directions 61, 65 are 90 degrees apart. Second, the scanner 26 is rotated or swiveled about the axis 64 as indicated by arrow 69.

As the scanner 26 is pivoted and rotated, the laser tracker 24 determines information on the position and orientation of the retroreflector 48 at each of movements in the predetermined pattern. For each movement, it is known that the spherical end member 56 is in a fixed position in contact with the surface 62. By analyzing the multiple measurements mathematically, the orientation and position of the six degree of freedom retroreflector 48 may be determined in relation to the scanner 46. The general method for solving such problems is referred to as a best-fit solution, usually by methods of least-squares minimization. Once the calibration process is complete, the laser tracker 24 is able to measure location and orientation information on the scanner 26 relative to the laser tracker local frame of reference 63.

A more complete description of the method used to obtain 3D coordinates of the surface 38 of the object 22 based on readings of the tracker and scanner is now given. The 6DOF tracker 24 measures three translational degrees of freedom of the retroreflector 48 included in the 6DOF assembly 16. These three translational degrees of freedom give the position of the 6DOF assembly 16 at a reference point, which may be a vertex of a cube-corner retroreflector or it may be another point having a known position relative to the retroreflector. Three translation degrees of freedom might be, for example, the coordinates x, y, z, determined by the tracker in the tracker frame of reference 63. In addition, the 6DOF tracker 24 measures three orientational degrees of freedom of the 6DOF assembly 16. There are many ways of determining the orientational degrees of freedom, as explained hereinabove. The three orientational degrees of freedom might be, for example, the angles pitch, roll, and yaw. The three orientational degrees of freedom are for the 6DOF assembly 16 having an assembly frame of reference 12; however, the three orientational degrees of freedom are determined by the tracker in the tracker frame of reference 63. In other words, the assembly frame of reference 12 may have a variety of orientations relative to the scanner 26, and the scanner 26 may be moved to a variety of orientations relative to the tracker. So a first step is to determine the three translational degrees of freedom and three orientational degrees of freedom of the 6DOF assembly in relation to the tracker. In other words, the first step is to determine the three translational degrees of freedom and three orientational degrees of freedom of the 6DOF assembly frame of reference 12 in relation to the tracker frame of reference 63.

A second step is to determine the relative position and orientation of the scanner frame of reference 10 in relation to the 6DOF assembly frame of reference 12. A scanner frame of reference may be defined in relation to a body 44 of the scanner 26, the body 44 holding the projector 36 and the camera 42, the projector and camera being fixed in relation to the body 44. The spherical end member 56 has a position known relative to the body 44, the projector 36, and the camera 42. These two frames of reference 10, 12 are fixed in relation to one another while a measurement of the surface 38 is being made. A method for the determining, at least in part, the relationship between the frame of reference 10 and the frame of reference 12 is to place a spherical end member 56 into a nest, which may be a conical surface for example. As explained hereinabove, the plurality of collected 3D coordinates provides, at least in part, the information needed to determine the translational and orientational degrees of freedom of the scanner frame of reference 10 in relation to the 6DOF assembly frame of reference 12. The laser tracker 24 measures a position of the retroreflector 48, which is invariant in 6DOF relative to the scanner 26. The spherical end member 56 is also invariant in position and orientation with respect to the scanner 26. The scanner camera 42 and projector 36 are fixed therefore in relation to the retroreflector 48 and spherical end member 56. By measuring with the laser tracker 24 a plurality of positions and orientations of the 6DOF assembly 16, the relationship between the frames of reference 10 and 12 can be found to within one degree of freedom, which is an angle of rotation of the 6DOF assembly 16 about an axis that connects the retroreflector reference point with the spherical end member 56. Mathematically, a transformation matrix may be used to transform measured values from one frame of reference to another frame of reference, as is well known in the art.

A third step is to determine the 3D coordinates of points on the surface 38 based at least in part on a pattern of light transmitted by the projector 36, an image received by a photosensitive array within the camera 42, and a baseline distance (not shown) between the camera and the projector.

By combining the 3D point measurements of the surface 38 made by the scanner 26 with the measurements of the 6DOF assembly 16 made by the laser tracker 24 and further considering the transformation relationships between the frames of reference 10, 12, and 63, the 3D coordinates of points on the surface 38 can be determined in the tracker frame of reference 63.

Figure 4:
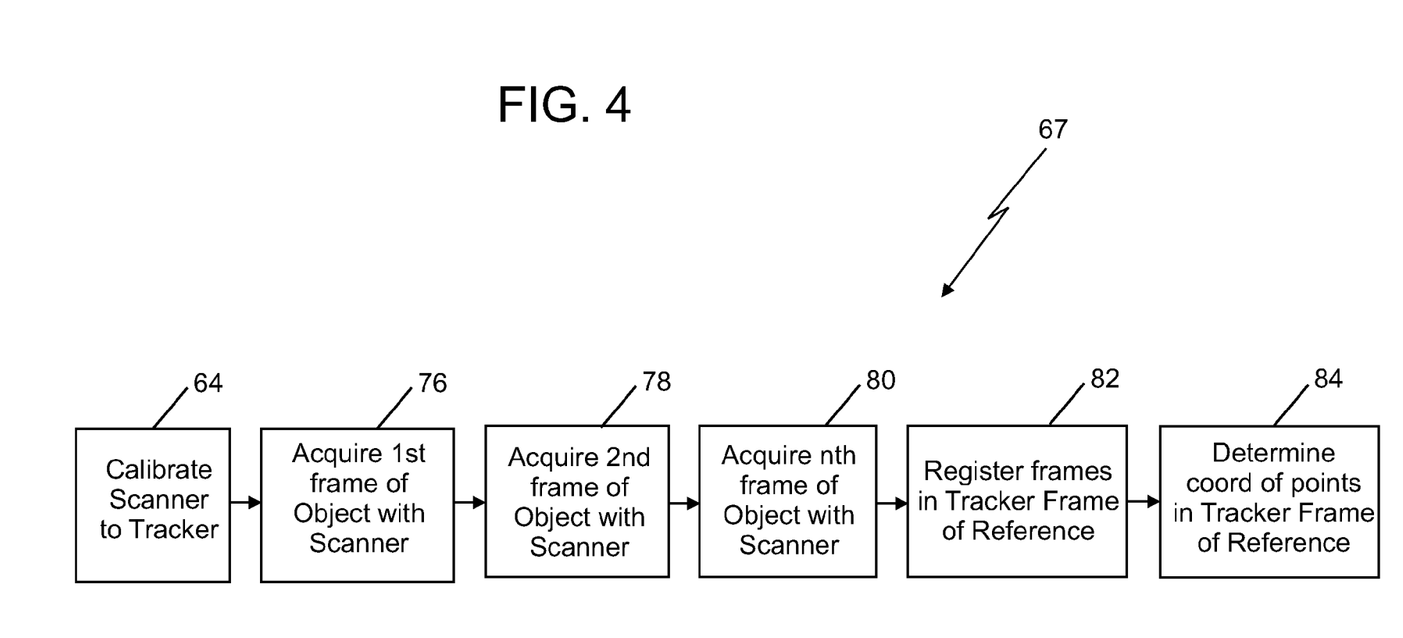
FIG. 4 is a flow diagram of a method of determining the three dimensional coordinates of points on the surface of an object in accordance with an embodiment of the invention.

Referring now to FIGS. 3-4 a process 67 of operating the laser tracker 24 and scanner 26 is shown for obtaining three dimensional coordinates of points on the surface 38 of object 22. Prior to operating the scanner 26, the calibration of the scanner 26 to the laser tracker 24 as described herein above is performed in block 64. As the scanner 26 is operated, light 28 from the laser tracker 24 is reflected off the retroreflector 48 so that the location and orientation of the scanner 26 is known to the laser tracker 24. As the scanner 26 is operated, the structured light pattern is emitted from the projector 36 reflected off of the surface 38 and captured by the camera 42. In the exemplary embodiment, the camera 42 captures image frames at a rate of 15-30 frames per second. Each of the sequential image frames 66, 68, 70 are illustrated as circles in FIG. 3, however the frames 66, 68, 70 may also be other shapes, such as a square or rectangle for example.

Due to the relatively high frame rate of the camera 42, there is likely to be areas of overlap between the image frames, represented by cross-hatched areas 72, 74. The amount of overlap will depend on the speed at which the operator moves the scanner 26. In prior art systems, features of object 22 that are located in the areas of overlap allowed for registration of the image frames relative to each other. However, when a flat or otherwise featureless surface is measured, the registration becomes more difficult and there is a tendency in prior art systems for the measurements to drift or for the surface to become "potato chip" shaped. Embodiments of the present invention provide advantages since the laser tracker 24 records the location and orientation of the scanner 26 as each image frame 66, 68, 70 is captured. Thus, the registration of the frames 66, 68, 70 allows for accurate location of the frames relative to each other without relying on the features of object 22. It should be further appreciated that this also provides advantages in allowing registration of image frames where there is no overlap between adjacent image frames.

After calibrating the scanner 26 in block 64, the scanner 26 scans the surface 38 in block 76 to acquire image frame corresponding to the projected pattern 66, while the laser tracker 24 records the location and orientation of the scanner 26. The process 67 proceeds to block 78 where the second frame 68 is captured along with the position and orientation of the scanner 26. This process continues until the $N^{th}$ frame is captured by the camera 42 in block 80. The process 67 then proceeds to register the image frames by matching adjacent frames relative to each other in block 82 using the location and position information measured and recorded by the laser tracker 24. The coordinates of the points on the surface of object 22 may then be determined in block 84. In the exemplary embodiment, the coordinates of the points are determined relative to the tracker frame of reference 63.

Figure 5:
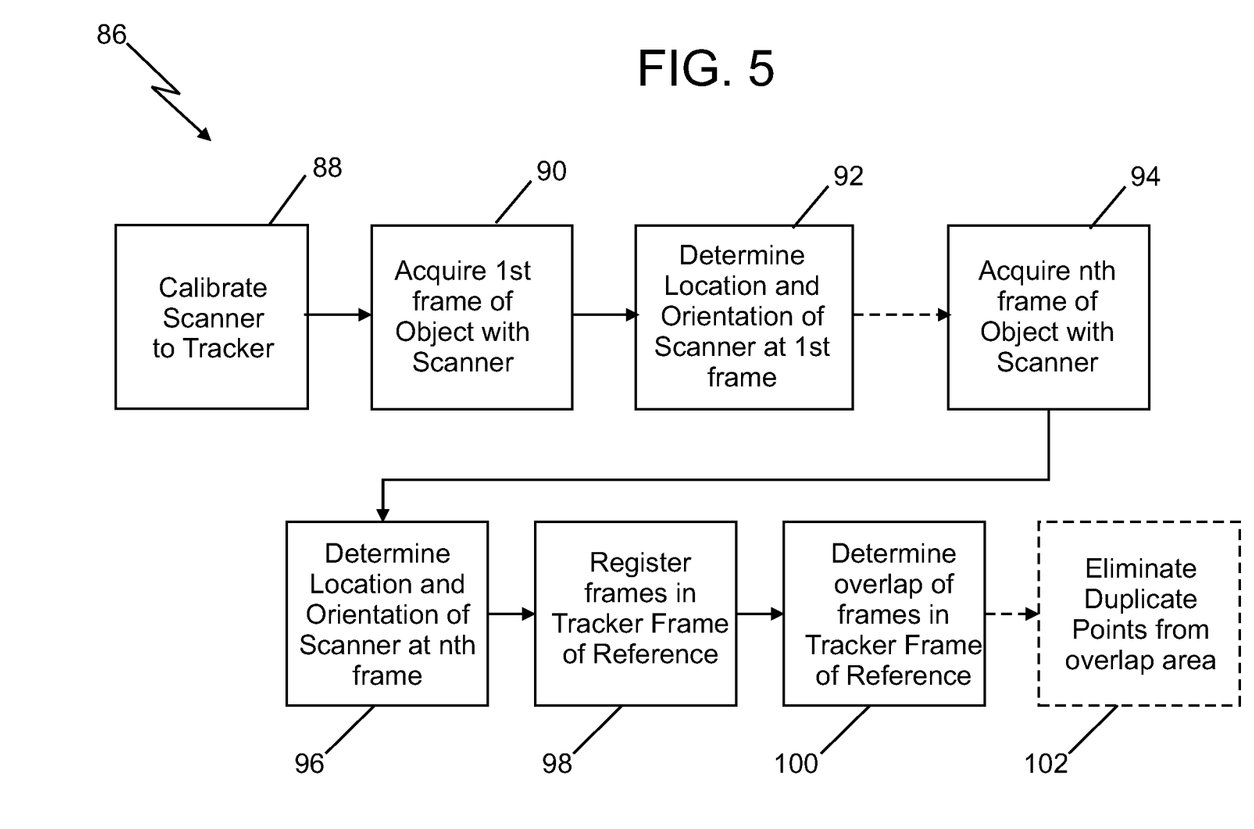
FIG. 5 is a flow diagram of a method of determining the three-dimensional coordinates of points on the surface of an object in accordance with another embodiment of the invention.

Referring now to FIGS. 3 and 5, another embodiment of a method 86 of operating the laser tracker 24 and scanner 26 is shown for obtaining three dimensional coordinates of points on the surface 38 of object 22. In this embodiment, the scanner 26 is calibrated to the laser tracker 24 in block 88 as described herein above. With the laser tracker 24 tracking the position and orientation of the scanner 26, the scanner 26 is operated to scan the surface 38 of object 22. The scanner 26 acquires the first frame 66 in block 90. The method 86 then determines the location and orientation of the scanner 26 at the time of the capture of the first frame 66 is determined in block 92. The process 86 continues capturing image frames and recording the location and orientation of the scanner 26 until the $N^{th}$ image frame is captured and the final location and orientation of the scanner 26 recorded in block 94 and block 96 respectively. The image frames are registered to each other in the tracker frame of reference 63 in block 98. The process 86 then proceeds to determine the areas of overlap 72, 74 in block 100. In one embodiment, the process 86 then proceeds to block 102 where duplicate or substantially duplicate data of points in the areas of overlap 72, 74 are eliminated to reduce the size of the coordinate data.

It should be appreciated that the process of registering the frames and determining the coordinates of points on the surfaces of the object may be performed by the laser tracker 24, the scanner 26, the computer 33 or a combination of the foregoing.

Technical effects and benefits of embodiments of the present invention include the tracking of a scanner with another coordinate measurement device, such as a laser tracker, to allow the registration of image frames acquired by the scanner. This registration of images may be performed without having to reference features on the object being scanned or the surrounding environment. This registration of images further may be performed without having areas of overlap in successive image frames.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of determining coordinates of points on a surface of an object with a laser tracker and a portable structured light scanner device, the method comprising:

providing the structured light scanner device, the structured light scanner device including a body, a first camera, a projector, a probe, a six-degree-of-freedom assembly, and a first processor, the body fixed in a scanner frame of reference, the first camera and the projector coupled to the body with a baseline distance between the first camera and the projector, the projector configured to project a projected pattern of light, the first camera configured to image the projected pattern of light reflected from the surface of the object as an imaged pattern, the probe coupled to the body, the probe having a first end and a second end, the first end coupled to the body and the second end having a spherical shaped surface, the six-degree-of-freedom assembly including a retroreflector, the six-degree-of-freedom assembly coupled to the body, the six-degree-of-freedom assembly having an assembly frame of reference, the first processor configured to determine coordinates of points on the surface of the object in the scanner frame of reference;

providing the laser tracker, the laser tracker including a first axis, a second axis, and a second processor, the laser tracker configured to measure a translational set of coordinates and an orientational set of coordinates, the translational set of coordinates being values of three translational degrees of freedom of the six-degree-of-freedom assembly in a tracker frame of reference and the orientational set of coordinates being values of three orientational degrees of freedom of the six-degree-of-freedom assembly in the tracker frame of reference, the translational set of coordinates and the orientational set of coordinates defining a position and orientation of the six-degree-of-freedom assembly in space, the laser tracker configured to send a first beam of light propagating at a speed of light in air to the retroreflector and to receive a second beam of light reflected by the retroreflector, the second beam of light being a portion of the first beam of light, the first beam of light having a first direction measured by a first angle of rotation about the first axis and a second angle of rotation about the second axis, the second processor configured to determine the orientational set of coordinates and the translational set of coordinates;

providing a fixture having a portion configured to receive the second end;

moving the structured light scanner device in a predetermined pattern while maintaining the second end in contact with the fixture and tracking the retroreflector with the first beam of light;

measuring a plurality of translational sets and orientational sets in response to movement of the structured light scanner device, the plurality of translational sets based at least in part on the received second beam of light, the speed of light in air, the first angle of rotation, and the second angle of rotation;

determining by the second processor a mathematical transformation between the assembly frame of reference and the tracker frame of reference based at least in part on the plurality of measured translational and orientational sets;

projecting the projected pattern of light on the surface of the object;

acquiring the imaged pattern;

measuring a first translational set and a first orientational set, the first translational set based at least in part on the received second beam of light, the speed of light in air, the first angle of rotation, and the second angle of rotation;

determining by the first processor the coordinates of the points on the surface of the object in the scanner frame of reference based at least in part on the baseline distance, the projected pattern of light, and the imaged pattern;

determining the coordinates of the points on the surface of the object in the tracker frame of reference based at least in part on the determined coordinates of the points on the surface of the object in the scanner frame of reference, the measured first translational set of coordinates, the measured first orientational set of coordinates, and the determined mathematical transformation; and storing the determined coordinates of the points on the surface of the object in the tracker frame of reference.

2. The method of claim 1 wherein:

in the step of providing the laser tracker, the laser tracker further includes a second camera that rotates about the first axis and the second axis;

in the step of measuring a plurality of translational sets and orientational sets, a plurality of second images of the structured light scanner device are acquired by the second camera and the plurality of orientational sets are further based at least in part on the plurality of second images.

3. The method of claim 2 wherein:

in the step of providing the structured light scanner device, the retroreflector is a cube corner retroreflector including three planar reflectors, each planar reflector configured to reflecting light, each planar reflector perpendicular to the other two planar reflectors, each planar reflector intersecting the other two planar reflectors in a common vertex, and each planar reflector having two intersection junctions, each intersection junction shared with an adjacent planar reflector for a total of three intersection junctions within the cube corner retroreflector, each intersection junction having a non-reflecting portion; and in the step of measuring a plurality of translational sets and orientational sets, the plurality of orientational sets are further based at least in part on features in the plurality of second images, the features corresponding to the non-reflecting portions.

4. The method of claim 2 wherein:

in the step of providing the structured light scanner device, the six-degree-of-freedom assembly further includes at least three non-collinear points of light; and in the step of measuring a plurality of translational sets and orientational sets, the plurality of orientational sets are further based at least in part on features in the plurality of second images, the features corresponding to the at least three non-collinear points of light.

5. The method of claim 4 wherein in the step of providing the structured light scanner device, the at least three non-collinear points of light are selected from a group consisting of retroreflective devices, light sources, and combinations thereof.

6. The method of claim 1 wherein:

in the step of providing the structured light scanner device, the retroreflector further includes an aperture for transmitting a portion of the first beam of light and a light sensor that registers an image of the transmitted first beam of light; and in the step of measuring a plurality of translational sets and orientational sets, the plurality of orientational sets are further based at least in part on the registered image.

7. The method of claim 6 wherein in the step of providing the structured light scanner device, the light sensor is a photosensitive array.

* * * * *